US012338666B1

(12) United States Patent
Xu

(10) Patent No.: US 12,338,666 B1
(45) Date of Patent: Jun. 24, 2025

(54) TRANSMISSION DEVICE FOR DOOR LOCK OF RECREATIONAL VEHICLE

(71) Applicant: SHENZHEN JAVDUN ZHINENGTECHCO, LTD, Guangdong (CN)

(72) Inventor: Xunlan Xu, Guangdong (CN)

( * ) Notice: Subject to any disclaimer, the term of this patent is extended or adjusted under 35 U.S.C. 154(b) by 0 days.

(21) Appl. No.: 18/957,359

(22) Filed: Nov. 22, 2024

(51) Int. Cl.

| | |
|---|---|
| ***E05B 83/44*** | (2014.01) |
| ***E05B 79/02*** | (2014.01) |
| ***E05B 81/06*** | (2014.01) |
| ***E05B 81/16*** | (2014.01) |
| ***E05B 81/34*** | (2014.01) |
| ***E05B 85/22*** | (2014.01) |
| *E05B 49/00* | (2006.01) |

(52) U.S. Cl.
CPC .............. *E05B 83/44* (2013.01); *E05B 79/02* (2013.01); *E05B 81/06* (2013.01); *E05B 81/16* (2013.01); *E05B 81/34* (2013.01); *E05B 85/22* (2013.01); *E05B 49/00* (2013.01)

(58) Field of Classification Search
CPC .......... E05B 81/06; E05B 81/18; E05B 81/30; E05B 81/36; E05B 81/56; E05B 83/44; E05B 85/061; E05B 2047/0058; E05B 2047/0094; E05B 19/0082; E05B 47/026; E05B 49/00; E05B 79/02; E05B 81/34; E05B 85/22
See application file for complete search history.

(56) References Cited

U.S. PATENT DOCUMENTS 10,711,489 B1 * 7/2020 Zhang ..................... E05B 63/04

* cited by examiner

*Primary Examiner* — Kristina R Fulton
*Assistant Examiner* — Thomas L Neubauer
(74) *Attorney, Agent, or Firm* — Hawaii Patent Services; Nathaniel K. Fedde; Kenton N. Fedde

(57) ABSTRACT

A transmission device for a door lock of a recreational vehicle comprises a first lock body and a second lock body that are detachably connected; the first lock body and/or the second lock body are provided with a transmission mechanism; the transmission mechanism comprises a deadbolt capable of sliding linearly and a first gear for pushing the deadbolt to slide; the radial surface of the first gear is provided with an eccentric part far away from the center of the gear, and the eccentric part is inserted into the deadbolt and is slidably connected with the deadbolt.

13 Claims, 9 Drawing Sheets

TRANSMISSION DEVICE FOR DOOR LOCK OF RECREATIONAL VEHICLE

TECHNICAL FIELD

The present disclosure relates to the technical field of recreational vehicle door locks, in particular to a transmission device for a door lock of a recreational vehicle.

BACKGROUND

A door lock of an recreational vehicle, as its name implies, refers to the door lock system installed on the recreational vehicle. As a special type of vehicle, recreational vehicle not only has the basic functions of ordinary vehicles, but also integrates the living function, therefore its door lock system also has its uniqueness and importance. The main function of an recreational vehicle door lock is similar to that of an ordinary door lock, which is to ensure safety and prevent unauthorized personnel from entering.

The existing US20240151071 discloses a "Deadbolt drive mechanism, handle fixing mechanism, and intelligent recreational vehicle lock". The door lock designed by this patent has an obvious safety hazard in structure. Specifically, after the deadbolt is successfully ejected and locked, there lacks the necessary self-locking or locking retaining mechanism. Therefore, once the deadbolt is directly pressed by an external force, it will be easily pressed back into the lock body, whether it is caused by a deliberate destruction attempt or an unintentional touch. Moreover, in the process of driving the recreational vehicle, if the recreational vehicle suffers from violent bump, the deadbolt may also retract into the lock body. Therefore, this design that lacks a self-locking function directly weakens the protective ability of the door lock and increases the safety risk.

Therefore, there is a need to put forward a new type of transmission mechanism for a door lock of a recreational vehicle with a self-locking function, thus improving the safety of the door lock.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The present disclosure provides a transmission device for a door lock of a recreational vehicle to solve the problems mentioned in the background art.

In order to achieve the above object, the present disclosure provides a transmission device for a door lock of a recreational vehicle, which includes a first lock body and a second lock body that are detachably connected; the first lock body and/or the second lock body are provided with a transmission mechanism; the transmission mechanism includes a deadbolt capable of sliding linearly and a first gear for pushing the deadbolt to slide; a radial surface of the first gear is provided with an eccentric part far away from the center of the gear, and the eccentric part is inserted into the deadbolt and is slidably connected with the deadbolt; the eccentric part and the deadbolt have a movable state and a self-locking state therebetween; when in the self-locking state, the eccentric part and the deadbolt form a triangular support structure.

The present disclosure further provides a transmission device for a door lock of a recreational vehicle, which includes a first lock body and a second lock body that are detachably connected; the first lock body and/or the second lock body are provided with a transmission mechanism; the transmission mechanism includes a deadbolt capable of sliding linearly and a first gear for pushing the deadbolt to slide; a radial surface of the first gear is provided with an eccentric part far away from the center of the gear, the deadbolt is provided with a through slot, and the eccentric part is inserted into and slidably connected with the through slot; the through slot is provided with a farthest end away from a center line of the deadbolt; when the eccentric part is located at the farthest end, the eccentric part and the deadbolt form a triangular support mechanism and are self-locked.

The present disclosure further provides a transmission device for a door lock of a recreational vehicle, which includes a first lock body and a second lock body that are detachably connected; the first lock body and/or the second lock body are provided with a transmission mechanism; the transmission mechanism includes a deadbolt capable of sliding linearly and a first gear for pushing the deadbolt to slide; a radial surface of the first gear is provided with an eccentric part far away from the center of the gear, the deadbolt is provided with a long rod part and a short rod part, and a right angle is formed between the long rod part and the short rod part; the short rod part is oriented towards the first gear and provided with a through slot, and the eccentric part is inserted into and slidably connected with the through slot; the through slot has a farthest end away from the long rod part, and when the eccentric part is located at the farthest end, the eccentric part, the short rod part and the long rod part form a right triangle and are self-locked.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

Figure 1:
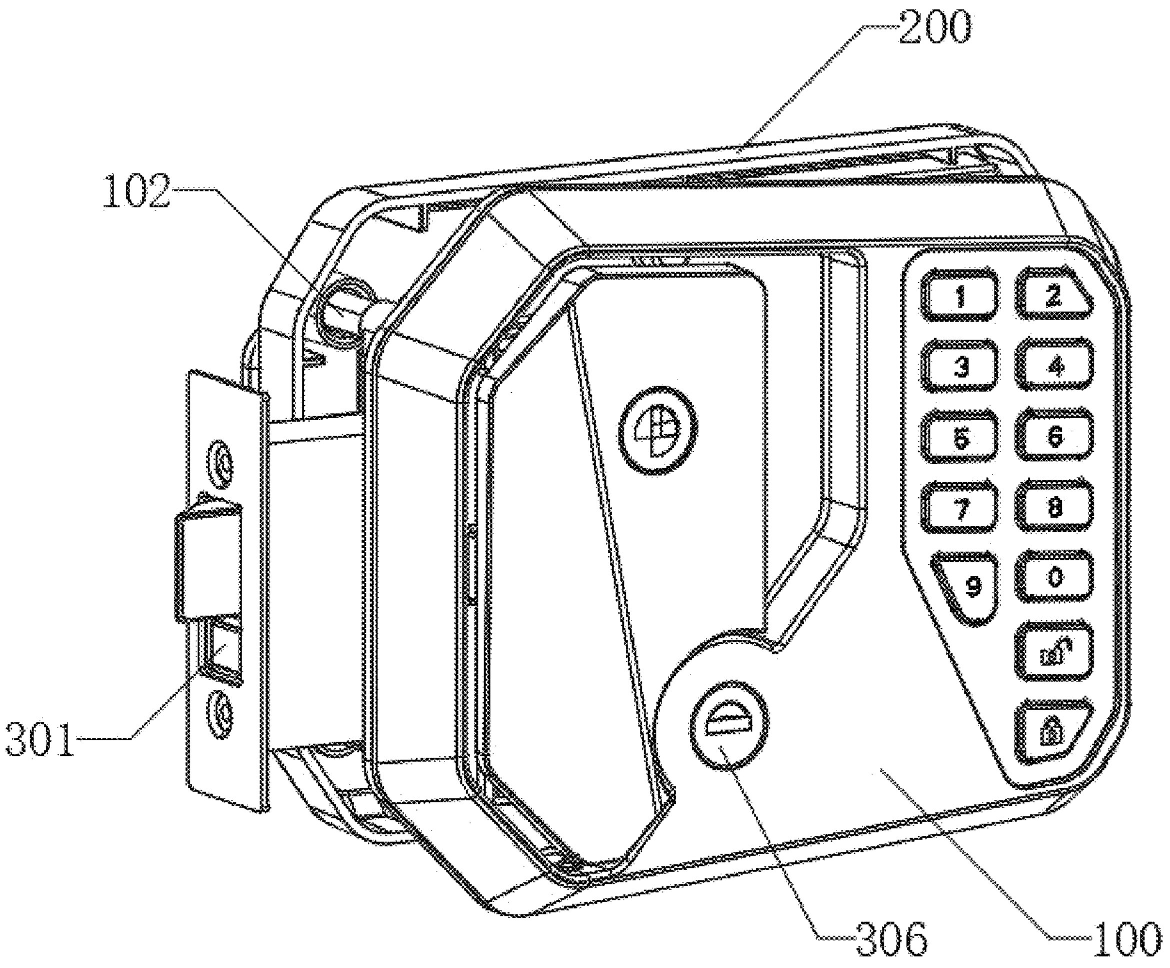
FIG. 1 is a three-dimensional structural schematic diagram of the present disclosure.
Figure 2:
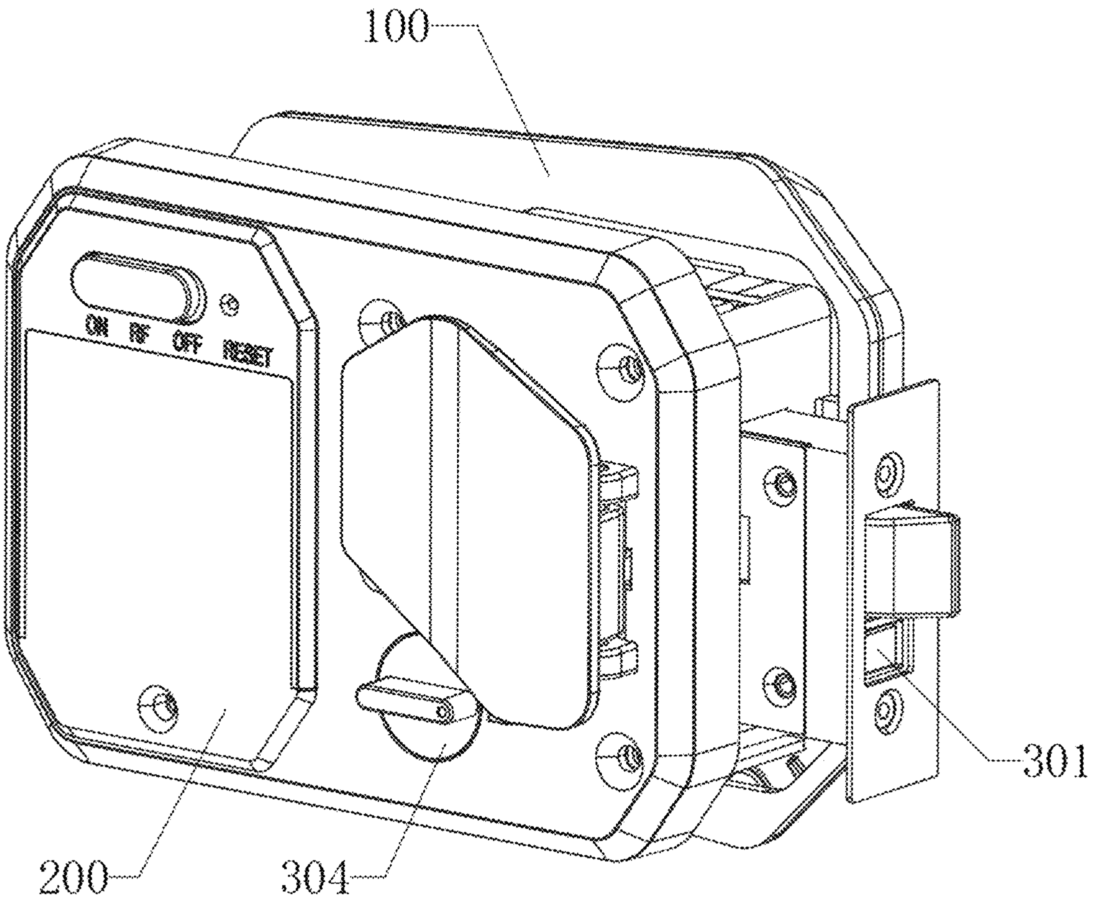
FIG. 2 is a schematic structural view from another perspective of FIG. 1.
Figure 3:
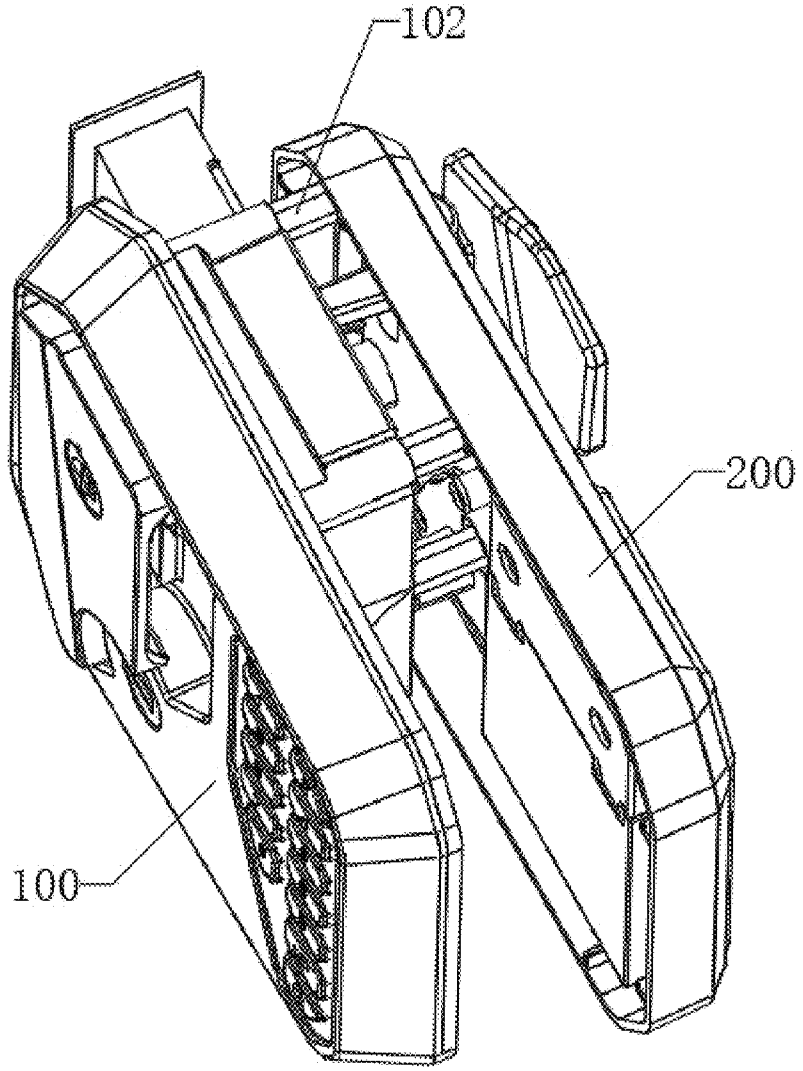
FIG. 3 is a schematic structural view from still another perspective of FIG. 1.
Figure 4:
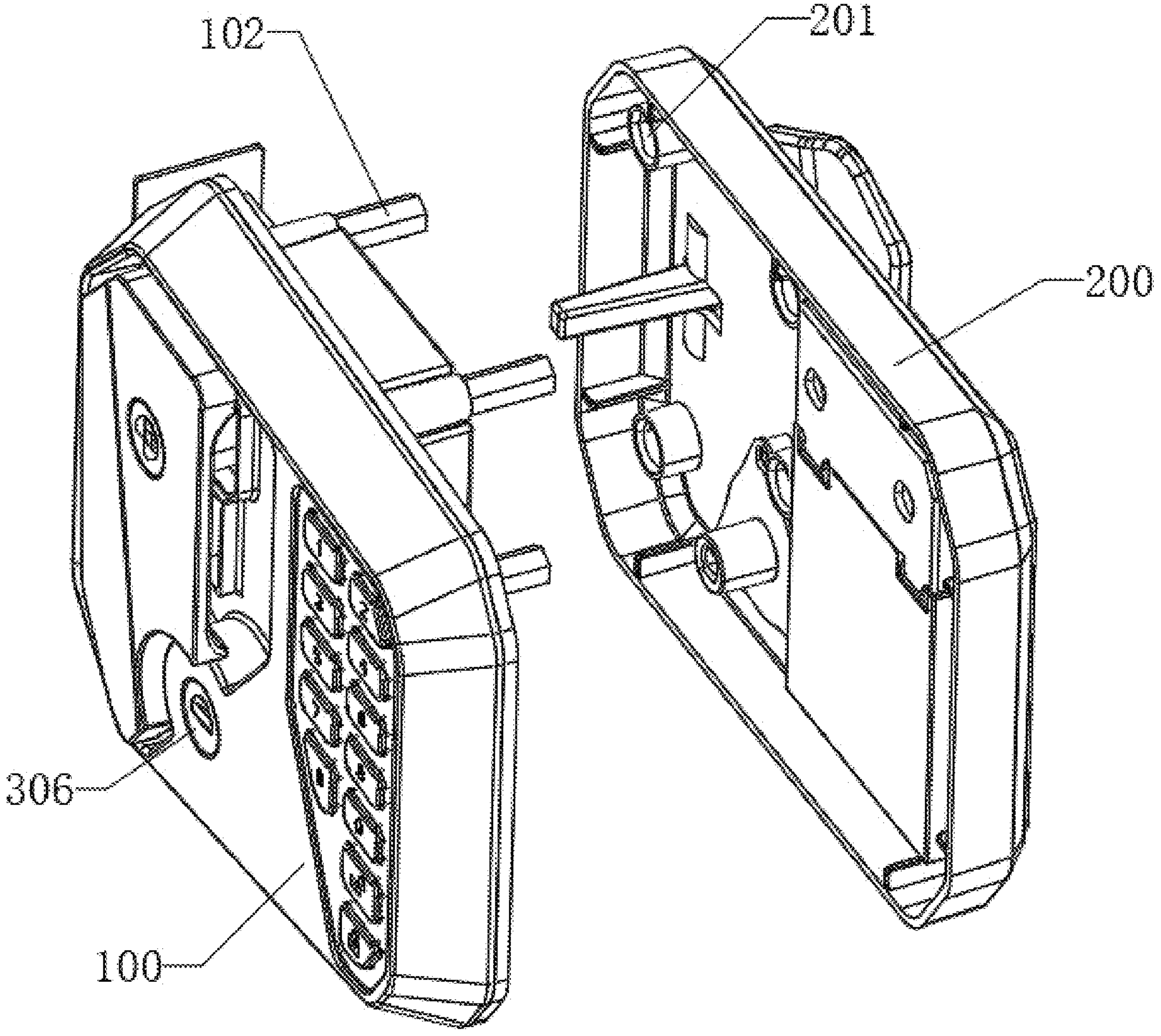
FIG. 4 is a schematic structural diagram of the present disclosure after detachment.

Reference signs: First lock body (100); Connecting hole (101); Stud (102); Slideway (103) (103); Second lock body (200); Through hole (201); Transmission mechanism (300); Deadbolt (301); Long rod part (3011); Short rod part (3012); Through slot (3013); First gear (302); Eccentric part (3021); Central shaft (3022); Second gear (303); Knob switch (304); Mechanical lock cylinder (305); Motor (306).

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

Please Refer to FIG. 1 to FIG. 10;

The present disclosure provides a transmission device for a door lock of a recreational vehicle, which includes a first lock body 100 and a second lock body 200, and the first lock body 100 and the second lock body 200 are detachably connected.

Specifically, as shown in FIGS. 2 to 5, the first lock body 100 and the second lock body 200 are arranged in parallel, and a plurality of connecting holes 101 are formed on the side of the first lock body 100 facing the second lock body 200. Studs 102 are inserted into the plurality of connecting holes 101, and the studs 102 are used to increase the installation distance between the first lock body 100 and the second lock body 200. A side of the second lock body 200 facing the first lock body 100 is provided with a plurality of through holes 201 that are arranged in one-to-one correspondence with the plurality of studs 102. Screws are inserted between the through holes 201 and the corresponding studs 102 for securing the first lock body 100 and the second lock body 200.

In this embodiment, the interior of the stud 102 is hollow and provided with internal threads, and the studs 102 are inserted into the connecting holes 101 by the threads, so that the studs 102 can be detached from the connecting holes 101.

As such, when the door lock is installed, the user can align the part of the first lock body 100 without the studs 102 with the door lock installation holes reserved on the door panel of the recreational vehicle in advance, and the first lock body 100 can be more smoothly and unimpeded embedded into the door lock installation hole without the obstruction of the studs 102 at this time, thus avoiding the installation difficulty caused by the size mismatch. This step greatly simplifies the installation process.

After the first lock body 100 is successfully embedded in the door panel, the user only needs to align the studs 102 with the door lock installation holes and screw studs into the holes. After the studs 102 are installed, the connecting part between the first lock body 100 and the second lock body 200 can be effectively lengthened by the length of the studs 102, which is convenient for the subsequent installation of the second lock body 200.

Therefore, after the studs 102 are installed, the user can embed the second lock body 200 into the other end of the door panel such that it is horizontally aligned with the first lock body 100. Then, screws are inserted between the through holes 201 and the installed studs 102, and the first lock body 100 and the second lock body 200 are firmly connected together by the fastening force of the screws, thus completing the installation of the door lock.

It is worth mentioning that through this installation structure, when the size of the door lock installation holes reserved on the door panel of the recreational vehicle is smaller than the standard dimension, the user does not need to enlarge the door lock installation hole. Because of the detachable connection structure between the studs 102 and the connecting holes 101, the installation of the door lock can be successfully completed even in small door lock installation holes. This method not only improves the user's installation convenience, but also reduces the risk of door lock damage caused by improper installation, further improving the overall quality of products and user satisfaction.

Further in this embodiment, the length of the stud can be selected according to the thickness of the door panel. It can be appreciated that when the door panel is thin, shorter studs are selected for connection; when the door panel is thick, longer studs are selected for connection. By setting studs with different lengths, the door lock can be easily installed on door panels with different thicknesses.

As shown in FIGS. 6 to 10, the self-locking structure of the deadbolt 301 in the present disclosure adopts the following technical solution: the first lock body 100 and/or the second lock body 200 are provided with a transmission mechanism 300. The transmission mechanism 300 includes a deadbolt 301 that can slide linearly, and a first gear 302 for pushing the deadbolt 301 to slide. The radial surface of the first gear 302 is provided with an eccentric part 3021 far from the center of the gear, and the eccentric part 3021 is inserted into the deadbolt 301 and slidably connected with the deadbolt 301. The eccentric part 3021 and the deadbolt have a movable state and a self-locking state therebetween. When in the self-locking state, the eccentric part 3021 and the deadbolt 301 form a triangular support structure.

In this embodiment, the transmission mechanism 300 is installed in the first lock body 100. The eccentric part 3021 is a circular shaft, the first lock body 100 is provided with a slideway 103, and the deadbolt 301 is located in the slideway 103 and is slidably connected with the slideway 103. The first gear 302 is rotatably installed in the first lock body 100 at the side of the slideway 103. The deadbolt 301 is L-shaped and has a long rod part 3011 and a short rod part 3012, and a right angle is formed between the long rod part 3011 and the short rod part 3012. The short rod part 3012 is oriented towards the first gear 302 and is provided with a through slot 3013, and the eccentric part 3021 is inserted into and slidably connected with the through slot 3013. The through slot 3013 has a farthest end away from the long rod part 3011. When the eccentric part 3021 is located at the farthest end, the eccentric part 3021, the short rod part 3012 and the long rod part 3011 form a right triangle to realize the self-locking state.

Figure 6:
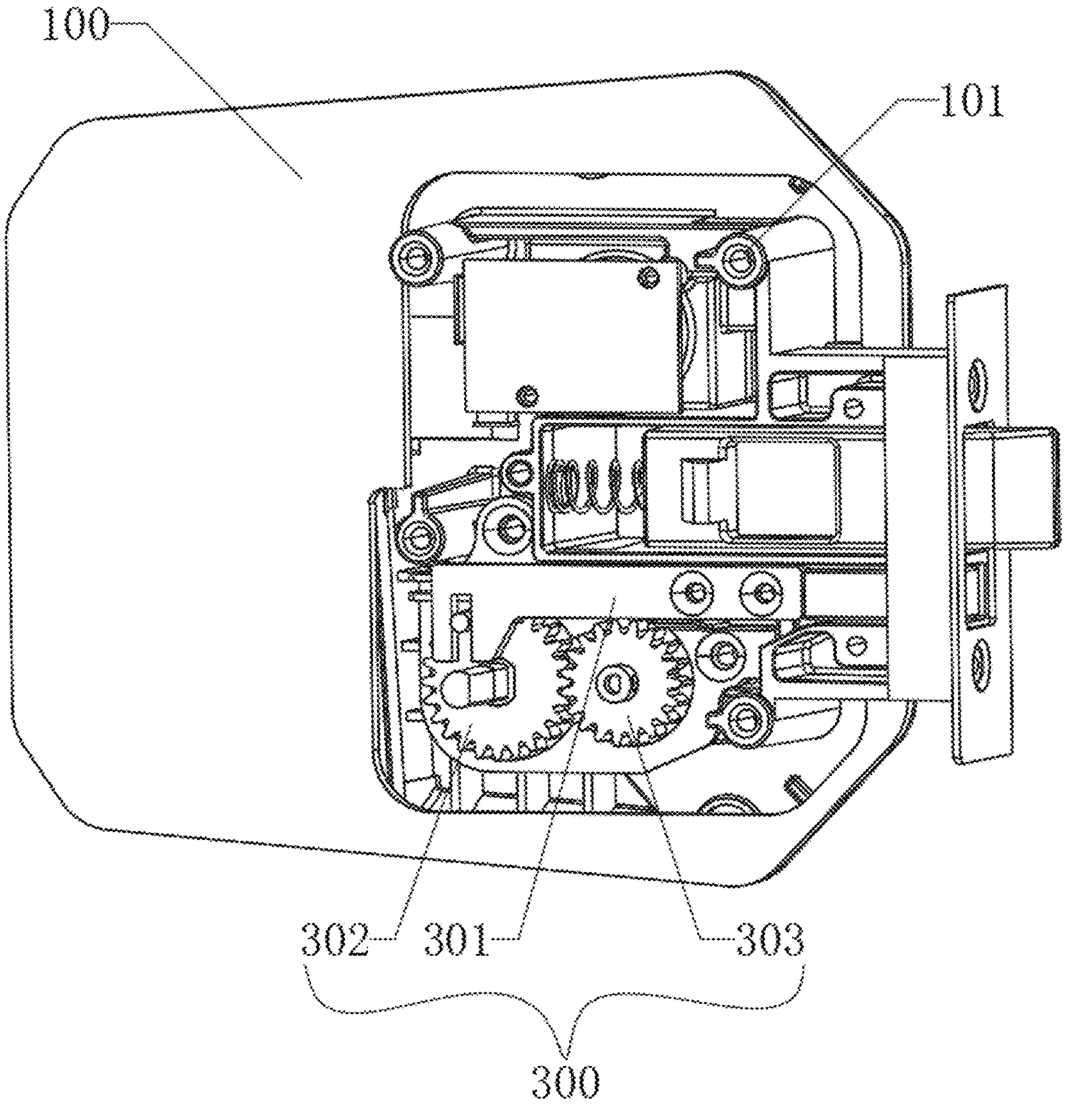
FIG. 6 is a schematic diagram of the internal structure of FIG. 5.
Figure 7:
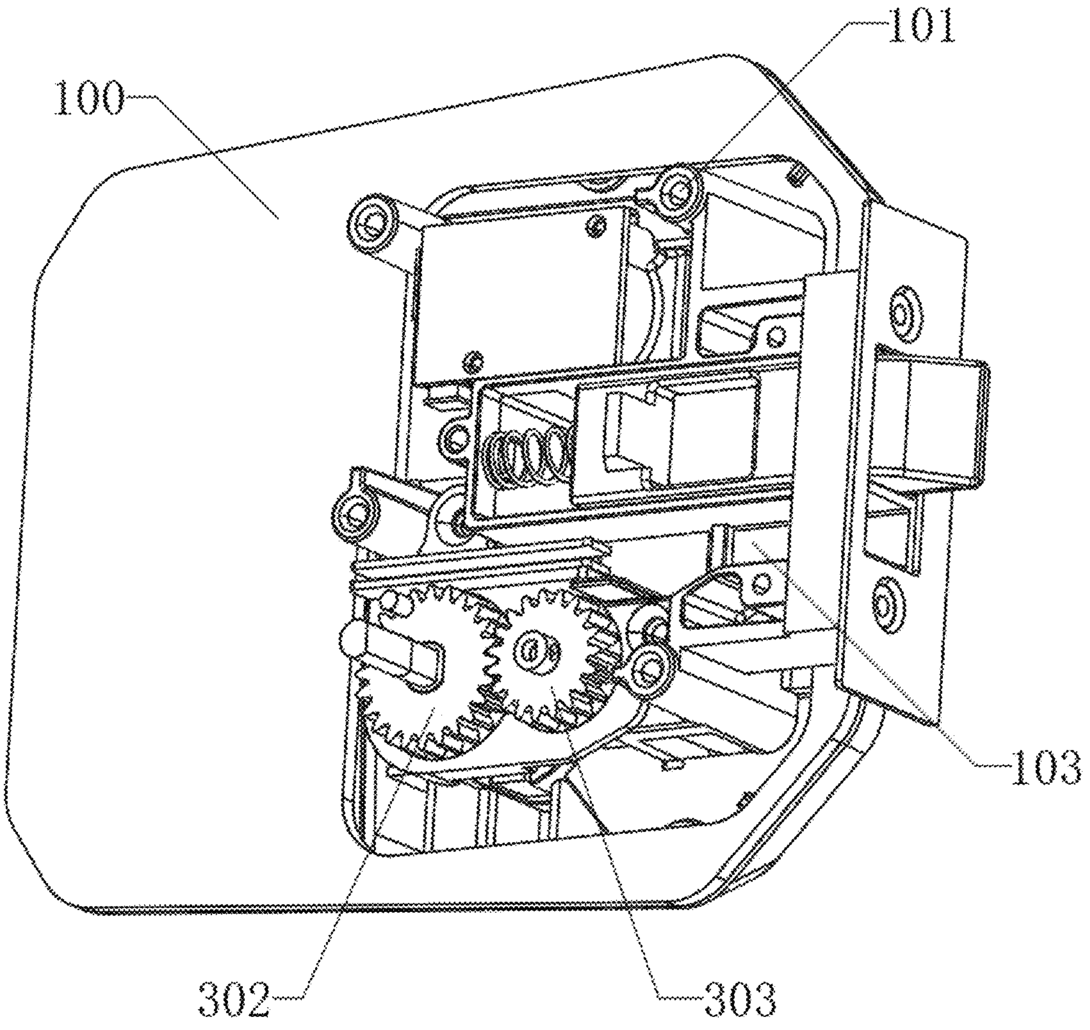
FIG. 7 is a schematic structural view of FIG. 6 after the deadbolt is removed.
Figure 8:
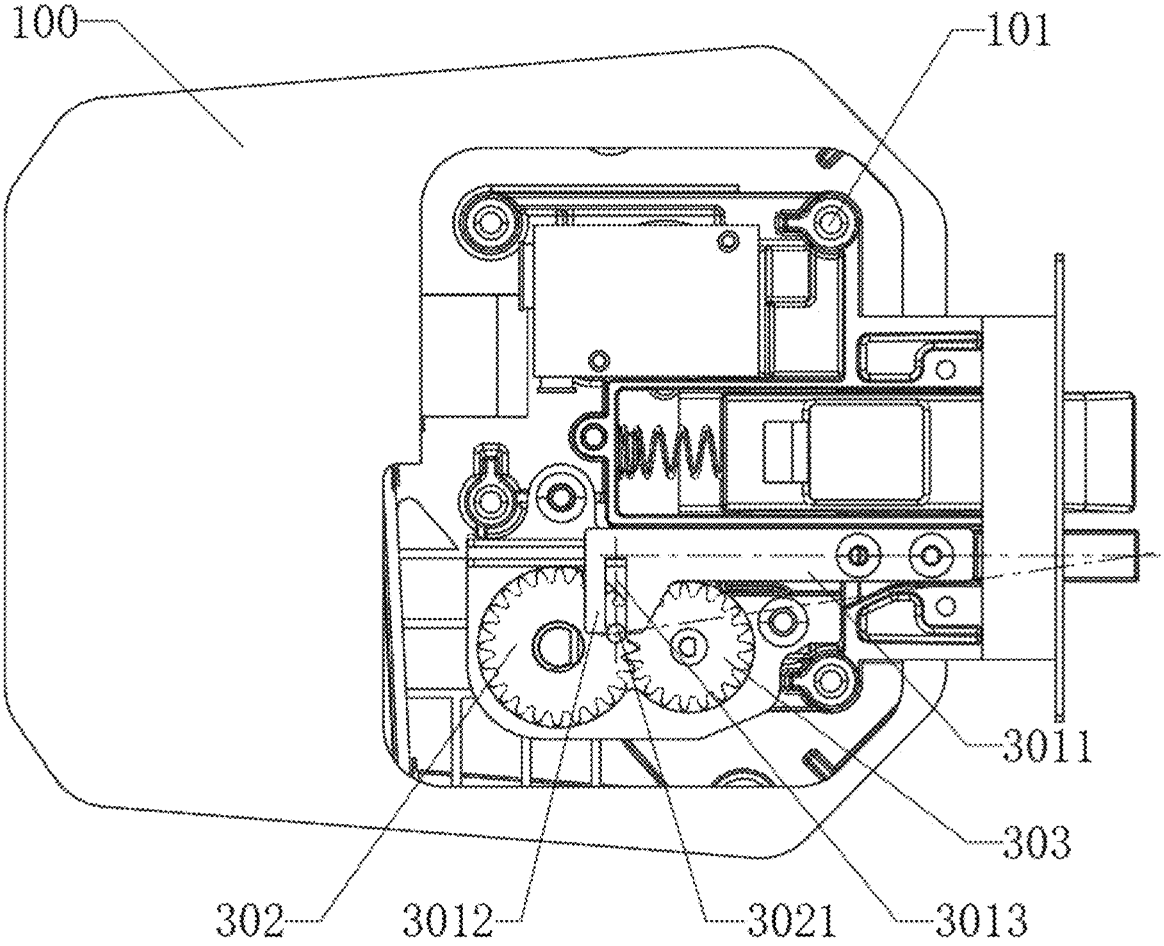
FIG. 8 is a schematic view of the self-locking state of FIG. 5.

Please refer to FIG. 6 to FIG. 8, the deadbolt 301 can slide left and right on the slideway 103. As the moving track of the deadbolt 301, the slideway 103 not only ensures the stability and accuracy of the deadbolt 301 in the sliding process, but further provides necessary guidance and support to improve the sliding stability of the deadbolt 301. When the deadbolt 301 slides to the right, the deadbolt 301 will slide out of the first lock body 100 and be inserted into the corresponding threshold lock hole, thus locking the door.

Figure 5:
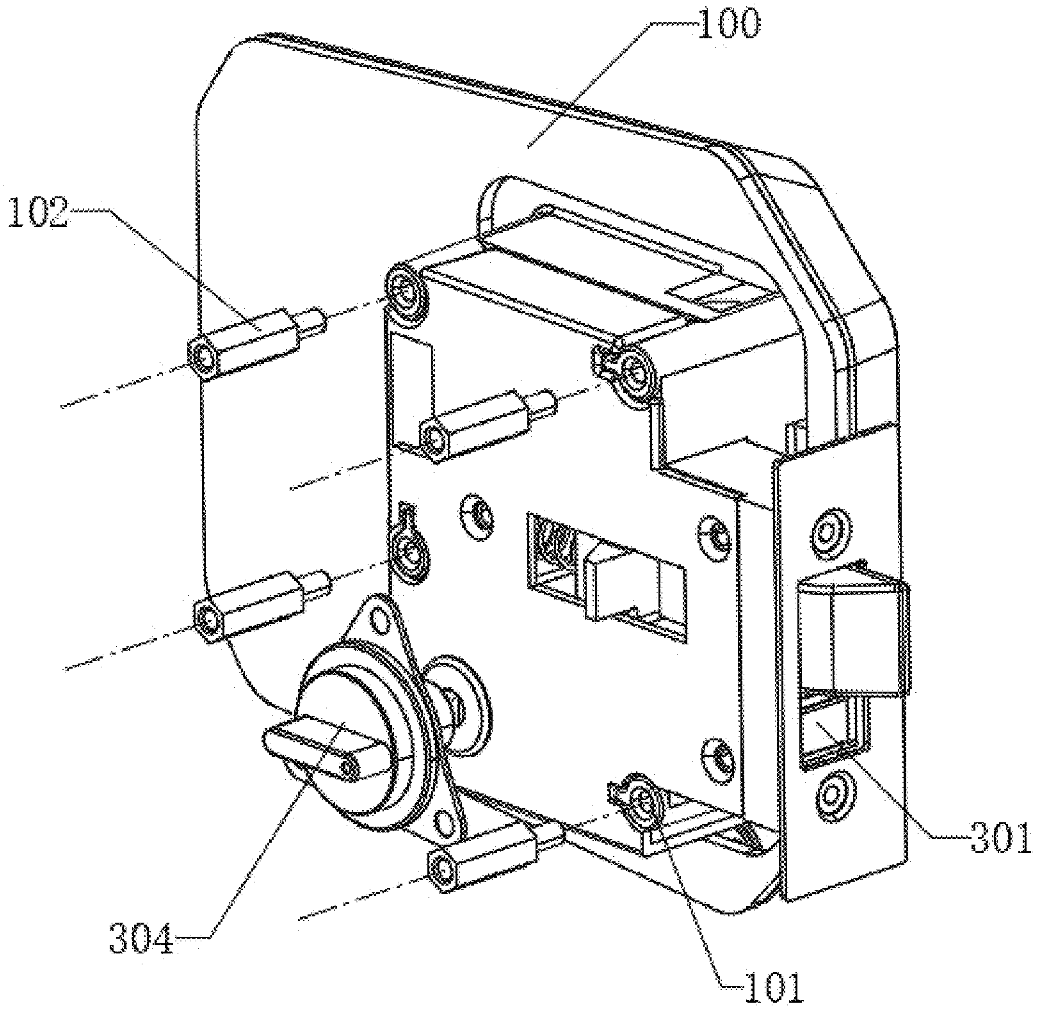
FIG. 5 is a schematic structural view of the back view of the first lock body of the present disclosure.

As shown in FIG. 5, a cover plate is installed on the side of the first lock body 100 facing the second lock body 200. The slideway 103 can be closed when the cover plate is installed on the first lock body 100, so as to position the deadbolt 301 in the first lock body 100 and avoid the deadbolt 301 from shaking back and forth.

The first gear 302 can rotate under the drive of an external force. When the first gear 302 rotates, the eccentric part 3021 on the first gear 302 rotates synchronously. While the eccentric part 3021 rotates, the eccentric part 3021 is slidably connected with the through slot 3013, therefore the eccentric part 3021 can push the deadbolt 301 to slide horizontally. Thus, the circular motion of the first gear 302 can be converted into the linear motion of the deadbolt 301.

Referring to FIG. 8, when the eccentric part 3021 moves to the end of the through slot 3013 farthest from the long rod part 3011, the eccentric part 3021, the short rod part 3012 and the long rod part 3011 form a right triangle. At the same time, the plane formed between the first gear 302 and the eccentric part 3021 is approximately parallel to the long rod part 3011. Therefore, when the deadbolt 301 is pressed by external force, the eccentric part 3021 is matched with the first gear 302 to resist the pressing force, and then the deadbolt 301 is clamped, so that the deadbolt 301 does not slide, and self-locking of the deadbolt 301 is realized. Thus, the deadbolt 301 would not be pressed into the first lock body 100 by the external force, thereby improving the safety of the door lock.

Of course, the deadbolt 301 is not limited to the L-shaped structure in this embodiment. In other embodiments of the deadbolt 301 (not shown), the deadbolt 301 can also be a single straight-strip structure, and the width of the deadbolt 301 is widened, while the through slot 3013 can be disposed at the end near the first gear 302, the end of the through slot 3013 far from the center line of the deadbolt 301 being the farthest end. As such, the straight-strip deadbolt 301 can also have the self-locking function.

Of course, the deadbolt 301 is not limited to the above two shapes, but can also be trapezoidal, triangular and other geometric shapes adapted for the self-locking mode of the present disclosure.

Figure 9:
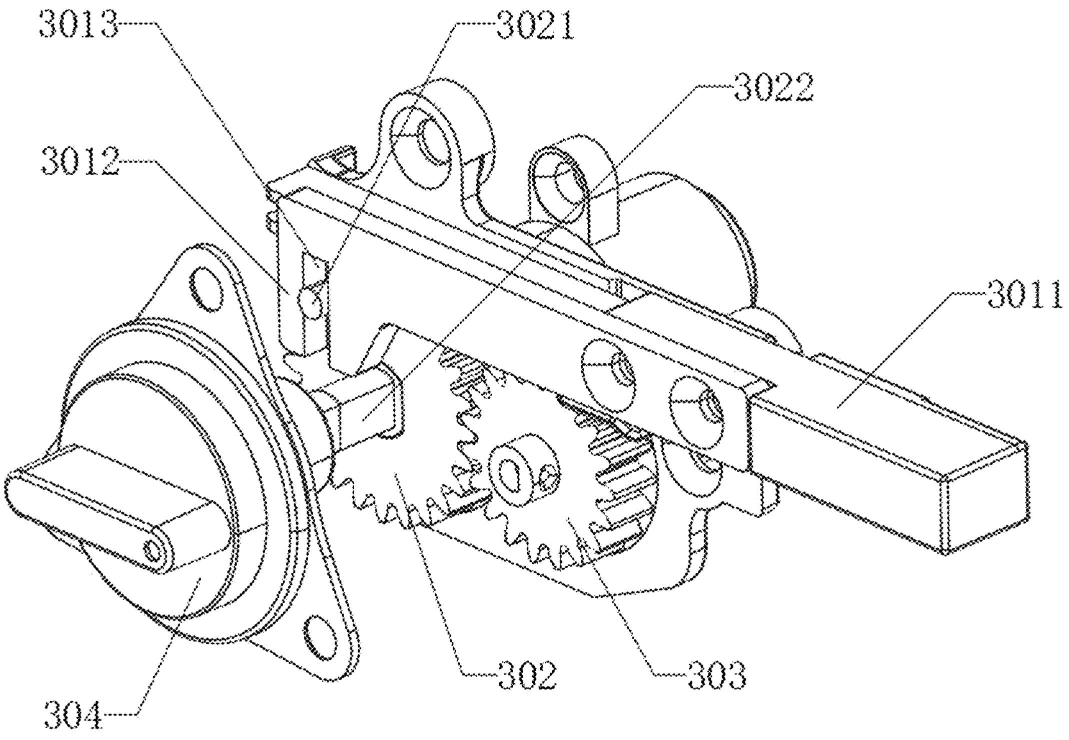
FIG. 9 is a schematic structural diagram of the transmission mechanism of the present disclosure.
Figure 10:
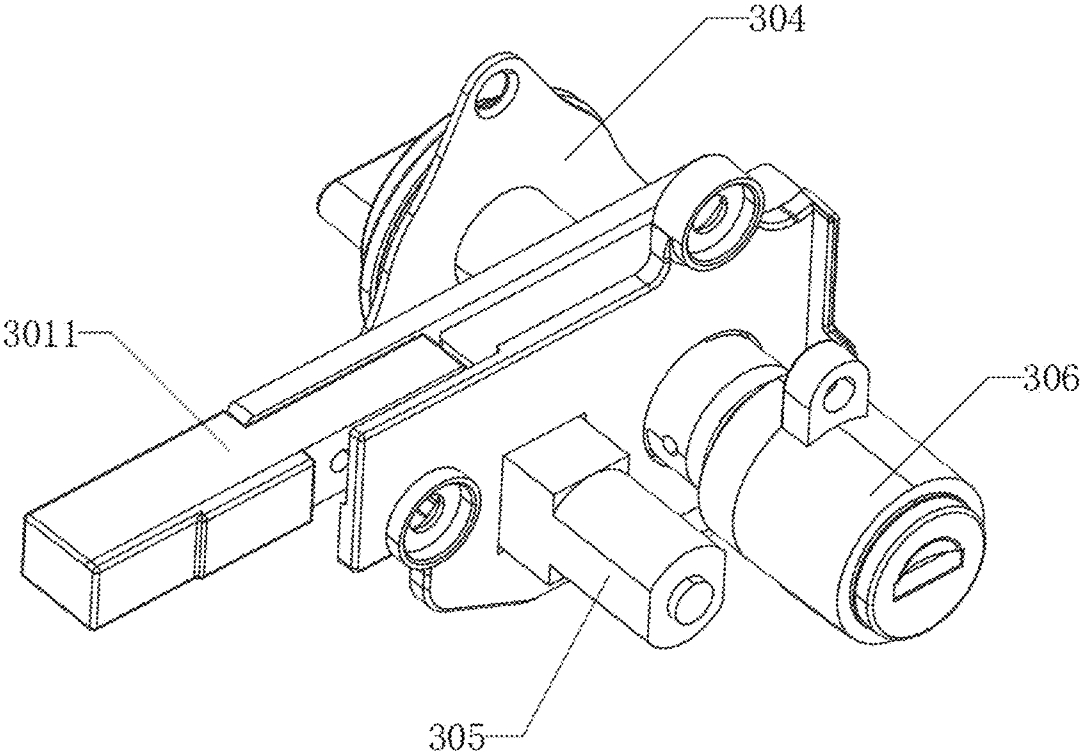
FIG. 10 is a schematic structural view from another perspective of FIG. 9.

As shown in FIGS. 9 and 10, the transmission mechanism 300 further includes a second gear 303, which is rotatably installed in the first lock body 100 and meshes with the first gear 302. A motor 306 is installed in the first lock body 100, and the power output shaft of the motor 306 is connected with the second gear 303. A central shaft 3022 is inserted into the center of the first gear 302. A knob switch 304 and a mechanical lock cylinder 305 are respectively installed at the two ends of the central shaft, and the knob switch 304 and the mechanical lock cylinder 305 penetrate through the first lock body 100 and the second lock body 200 respectively.

In this embodiment, the knob switch 304 is disposed on the indoor side of the door lock. The central shaft 3022 and the first gear 302 can be driven to rotate by manually turning the knob switch 304, and the rotating first gear 302 drives the deadbolt 301 to slide, so that the door lock can be unlocked or locked manually.

The mechanical lock cylinder 305 is disposed on the side of the outdoor side of the door lock, and a matching key can be inserted into the mechanical lock cylinder 305. When the key is inserted into the mechanical lock cylinder 305, the mechanical lock cylinder 305 can be unlocked and rotated by the key, which can drive the central shaft 3022 and the first gear 302 to rotate. The rotating first gear 302 drives the deadbolt 301 to slide, so that the door lock can be unlocked or locked by the key.

The motor 306 can drive the second gear 303 to rotate. When the second gear 303 rotates, since the second gear 303 meshes with the first gear 302, the second gear 303 will also synchronously drive the first gear 302 to rotate. The rotating first gear 302 drives the deadbolt 301 to slide, so that the door lock can be unlocked or locked by electric means.

The motor 306 can be equipped with an intelligent control panel, which can be equipped with a fingerprint unlocking module, a password unlocking module, a wireless remote control unlocking module, a video monitoring module, a face recognition module, a card swiping module, an NFC module, a WIFI or Bluetooth module and the like. With a variety of unlocking methods, the unlocking methods of door locks can be increased, thus realizing intelligent control unlocking, and improving the convenience of users. The above-mentioned mode of intelligent control belongs to the well-known technology in the field, and thus will not be repeated in this application.

The technical means disclosed in the scheme of the present invention are not limited to the technical means disclosed in the above embodiments, but also include the technical scheme composed of any combination of the above technical features. It should be pointed out that for those skilled in the art, several improvements and embellishments can be made without departing from the principle of the present invention, and these improvements and embellishments are also regarded as the protection scope of the present invention.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for case of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A transmission device for a door lock of a recreational vehicle, comprising a first lock body and a second lock body that are detachably connected, wherein the first lock body and/or the second lock body are provided with a transmission mechanism;

the transmission mechanism comprises a deadbolt capable of sliding linearly and a first gear for pushing the deadbolt to slide;

a transverse surface of the first gear is provided with an eccentric part far away from the center of the gear, and the eccentric part is inserted into the deadbolt and is slidably connected with the deadbolt;

the eccentric part and the deadbolt have a movable state and a self-locking state therebetween, wherein when in the self-locking state, the eccentric part and the deadbolt form a triangular support structure; and the deadbolt is L-shaped and has a long rod part and a short rod part, and a right angle is formed between the long rod part and the short rod part, wherein the short rod part is oriented towards the first gear and is provided with a through slot, and the eccentric part is inserted into and slidably connected with the through slot.

2. The transmission device for a door lock of a recreational vehicle according to claim 1, wherein the first lock body is provided with a slideway, the deadbolt is located in the slideway and slidably connected with the slideway, and the first gear is rotatably installed in the first lock body and located at a side of the slideway.

3. The transmission device for a door lock of a recreational vehicle according to claim 1, wherein the through slot has a farthest end away from the long rod part.

4. The transmission device for a door lock of a recreational vehicle according to claim 3, wherein when the eccentric part is located at the farthest end, the eccentric part, the short rod part and the long rod part form a right triangle to realize the self-locking state.

5. A transmission device for a door lock of a recreational vehicle, comprising a first lock body and a second lock body that are detachably connected, wherein the first lock body and/or the second lock body are provided with a transmission mechanism;

the transmission mechanism comprises a deadbolt capable of sliding linearly and a first gear for pushing the deadbolt to slide;

a transverse surface of the first gear is provided with an eccentric part far away from the center of the gear, the deadbolt is provided with a through slot, and the eccentric part is inserted into and slidably connected with the through slot;

the through slot is provided with a farthest end away from a center line of the deadbolt;

when the eccentric part is located at the farthest end, the eccentric part and the deadbolt form a triangular support mechanism and are self-locked;

the deadbolt is slidably installed in the first lock body, the first gear is rotatably installed in the first lock body, and the first lock body is provided with an opening through which the deadbolt penetrates;

the deadbolt is L-shaped and has a long rod part and a short rod part, the short rod part is oriented towards the first gear, and a right angle is formed between the long rod part and the short rod part; and the through slot is disposed on the short rod part, and the center line of the deadbolt is located on the long rod part.

6. The transmission device for a door lock of a recreational vehicle according to claim 5, wherein the transmission mechanism further comprises a second gear which is rotatably installed in the first lock body and meshes with the first gear.

7. The transmission device for a door lock of a recreational vehicle according to claim 6, wherein a motor is installed in the first lock body, and a power output shaft of the motor is connected with the second gear.

8. The transmission device for a door lock of a recreational vehicle according to claim 5, wherein a central shaft is inserted into the center of the first gear, a knob switch and a mechanical lock cylinder are respectively installed at the two ends of the central shaft, and the knob switch and the mechanical lock cylinder penetrate through the first lock body and the second lock body respectively.

9. A transmission device for a door lock of a recreational vehicle, comprising a first lock body and a second lock body that are detachably connected, wherein the first lock body and/or the second lock body are provided with a transmission mechanism;

the transmission mechanism comprises a deadbolt capable of sliding linearly and a first gear for pushing the deadbolt to slide; and a transverse surface of the first gear is provided with an eccentric part far away from the center of the gear, the deadbolt is provided with a long rod part and a short rod part, and a right angle is formed between the long rod part and the short rod part; and the short rod part is oriented towards the first gear and provided with a through slot, and the eccentric part is inserted into and slidably connected with the through slot; and the through slot has a farthest end away from the long rod part, and when the eccentric part is located at the farthest end, the eccentric part, the short rod part and the long rod part form a right triangle and are self-locked.

10. The transmission device for a door lock of a recreational vehicle according to claim 9, wherein the first lock body and the second lock body are arranged in parallel, and a surface of the first lock body facing the second lock body is provided with a plurality of connecting holes.

11. The transmission device for a door lock of a recreational vehicle according to claim 10, wherein studs are inserted into the plurality of connecting holes, and the studs are configured for increasing an installation distance between the first lock body and the second lock body.

12. The transmission device for a door lock of a recreational vehicle according to claim 11, wherein a side of the second lock body facing the first lock body is provided with a plurality of through holes that are disposed in one-to-one correspondence with the plurality of studs.

13. The transmission device for a door lock of a recreational vehicle according to claim 12, wherein screws are inserted between the plurality of through holes and the corresponding studs for securing the first lock body and the second lock body.

* * * * *